United States Patent
Thor et al.

(10) Patent No.: US 7,212,323 B2
(45) Date of Patent: May 1, 2007

(54) METHODS AND APPARATUS FOR MASS MANUFACTURING TWO-DIMENSIONAL BINARY INFORMATION ON TRANSPARENT SUBSTRATES USING PHASE CONTRAST MODULATED TEMPLATES

(75) Inventors: Gautam Thor, San Diego, CA (US); Mansoor Siddiqi, Bombay (IN)

(73) Assignee: Coded Imagery, Inc., San Diego, CA (US)

( * ) Notice: Subject to any disclaimer, the term of this patent is extended or adjusted under 35 U.S.C. 154(b) by 0 days.

(21) Appl. No.: 10/390,219

(22) Filed: Mar. 15, 2003

(65) Prior Publication Data

US 2003/0223102 A1 Dec. 4, 2003

Related U.S. Application Data

(60) Provisional application No. 60/364,961, filed on Mar. 15, 2002.

(51) Int. Cl.
*G02B 5/32* (2006.01)

(52) U.S. Cl. .............. 359/15; 359/9; 359/19; 359/29; 359/22

(58) Field of Classification Search ............. 359/15, 359/3, 4, 19, 9, 29, 22
See application file for complete search history.

(56) References Cited

U.S. PATENT DOCUMENTS

| | | | | |
|---|---|---|---|---|
| 5,347,375 A | * | 9/1994 | Saito et al. ............ | 359/9 |
| 5,386,378 A | * | 1/1995 | Itoh et al. ............ | 708/816 |
| 5,436,740 A | * | 7/1995 | Nakagawa et al. ...... | 359/9 |
| 6,176,582 B1 | * | 1/2001 | Grasnick ............ | 353/7 |

* cited by examiner

*Primary Examiner*—Fayez G. Assaf
(74) *Attorney, Agent, or Firm*—D.B. Technical Consulting; Donald Bollella

(57) ABSTRACT

Methods and apparatus for making, encoding, and encrypting binary patterns for storing recorded information. One of the methods includes the steps of providing an original image, fragmenting the original image into at least two parts including a first part and a second part, forming a mirror image of one of the a least two parts, inverting the first and second parts, forming a binary pattern of the first part and the second part, and forming a mirror image of the binary pattern of the one of the a least two parts. In this method the binary pattern in each of the parts includes information representing a respective portion of the original image.

6 Claims, 11 Drawing Sheets

Step 1

Input file M

Step 2

Part A of M    Part B of M

Step 3

A          B'
       Mirror of B
       on y-axis

Step 4

B'          A

Rotation 180 deg

Step 5

Step 6

Step 7

| Numeral Or Character | Corresponding CGH |
|---|---|
| 1 |  |
| 4 |  |
| 2 |  |
| 8 |  |
| 5 |  |
| 7 |  |

Original CGH with Square pixels

**Modified CGH with Rectangular pixels
(resulting from 50% contraction
along the Y-axis)**

**Modified CGH with Rectangular pixels
(resulting from 66% contraction
along the Y-axis)**

INSTRUMENT FOR VERIFICATION OF CGH
(SPECIALLY MODIFIED TO OBFUSCATE DIRECT DECODING)

Modified CGH of input file M      Distorted and illegible image projected on Screen
(viewed directly)     when CGH placed in 'HORIZONTAL' position

INSTRUMENT FOR VERIFICATION OF CGH
(SPECIALLY MODIFIED TO OBFUSCATE DIRECT DECODING)

Modified CGH of input file M
(appropriately orientated)

Perfectly legible image projected on Screen
when CGH placed in 'INCLINED' position

METHODS AND APPARATUS FOR MASS MANUFACTURING TWO-DIMENSIONAL BINARY INFORMATION ON TRANSPARENT SUBSTRATES USING PHASE CONTRAST MODULATED TEMPLATES

CROSS-REFERENCE TO RELATED APPLICATIONS

This application claims the benefit of priority from U.S. Provisional Application Ser. No. 60/364,961 entitled "Preparation of a Phase Contrast Modulated Template" filed Mar. 15, 2002 which is herein incorporated by reference in its entirety.

The present application also contains subject matter from U.S. Disclosure Document No. 503,596 received at the OIPE of the USPTO on Jan. 16, 2002.

BACKGROUND OF THE INVENTION

1. Field of the Invention

This invention relates in general to image regeneration and, in particular, to holographic image regeneration derived from a mathematically defined digital source image by proposing the use of frequency ranges in the electromagnetic spectrum in the non visible ranges. The present invention is further directed to encryption techniques in the coding substrates and decoding devices and their subsequent utility.

More specifically, but without restriction to the particular embodiments hereinafter described in accordance with the best mode of practice, this invention relates to methods for mass manufacturing of two-dimensional microstructures capable of diffracting light.

These specialized amplitude diffraction gratings can be deposited on any type of rigid or semi rigid thermoplastic substrates. The substrate material may include plastic, glass, chemical coatings (e.g. optically-clear adhesive coatings) or any other suitable transparent or semi-transparent rigid or semi-rigid substrate.

The present invention is also directed to apparatus for viewing computer generated holograms (CGH). Such computer generated holograms may be typical CGHs or those encrypted according to the rectangulation methods of the present invention.

2. General Discussion and Related Art

Invisible ink, historically purported to be the most classical method for hiding information is probably considered outdated in today's digital world where numerous covert and overt techniques in the field of coding and decoding exist. Oftentimes complex encryption processes comprising mathematical formulae and electrical engineering based algorithms are used to hide information and reinterpret it after transmission, with appropriate "keys". The unauthorized copying and theft through the counterfeit manufacture of copyrighted materials, brand names, trademarked property, credit cards, and even individual identities is one of the greatest concerns of both businesses and individuals today. Current measures including distinctive markings, holographic images, photographs, smart chips, and other known techniques that are used to certify the authenticity of products and or identities are proving to be inadequate because they too can be counterfeited.

Industry estimates of worldwide product piracy costs to owners and manufacturers of intellectual property and branded products was approximately $250 billion in the year 2001. Consumers are most often the victims of product piracy unwittingly purchasing counterfeit products believing them to be the genuine articles. The ability to record valuable intellectual property in tags used to authenticate branded goods is fast becoming a necessity. Aspects of the present invention are directed to such tagging and encrypted marking. Such tags or markings can be read and validated by the consumer, retailer, owner, and manufacturer of intellectual property to accurately, and with great precision authenticate, track and protect the value of branded products.

Holograms have been commonly used as security devices. Light reflected from an object is allowed to interact with another coherent beam and the interference pattern caused by the two wave fronts results in a recording medium carrying phase and amplitude information of the object. When the recording medium is subsequently illuminated by a coherent source of light, the virtual image of the object becomes apparent. Some types of holograms are even visible in coherent light. Approaches relying on the use of covert images and special verification equipment exist but there is a continuing need in the art for secure information verification and reliable transmission that can be cost-effectively produced.

The present invention is directed to methods and apparatus for generating, encrypting, and viewing specialized holograms that are mathematically defined. These methods utilize several steps at different levels to ensure a successful encryption process. Thus one aspect of the invention utilizes the generation of Computer Generated Holograms (CGHs) in the encryption process. In one embodiment, the CGH file of an original image is rendered as a binary pattern that can be transmitted onto a substrate by relevant printing techniques. In another embodiment, a binary phase contrast mask performs the binary rendition. An advantage of this procedure is that an image is generated that is invisible to the naked eye unless a point source is viewed through it whereupon a virtual image is generated. The actual pattern that is embossed in the material is impossible to replicate.

Lohman and Paris (Appl. Optics Vol 6. No. 10, 1967) pioneered Computer Generated Holograms or Binary Fraunhofer Holograms. They demonstrated a procedure for creating holograms from objects that could be defined in mathematical terms. They described the selection of a proper format of the hologram and a method using Fourier transformations to develop a pattern of binary information that could reconstruct a mathematical form visually using a point source of light for illumination. Today, several such algorithms exist. In general the algorithm used should be capable of generating data files used to produce Far Field (or Fourier) Holograms (for e.g. Van der Gracht, Am. J. of Phys. (1994) 934–937). A CGH is a diffraction screen whose pattern has been calculated by a computer such that the process of illumination by a point source of light generates the desired image by reconstructing interference patterns.

Laser-assisted reprographic film printers and plotters have been widely used to produce CGHs (Press et al. "The Art of Scientific Computing", Cambridge, 1989). Similarly, binary amplitude Diffractive Optic Elements (DOEs) are also considered to generate holographic images as indeed they can be defined as holographic elements generated by the interference of two wave fronts that produce components with optical properties. Numerous applications of the generation of computer-assisted holographic DOEs are available (Becker & Dallas Opt. Comm. 15, 50–133, 1975; Gonsalves & Proshaska Proc. SPIES. 938, 472–76, 1988). Currently, photographic duplication using negative films in contact with an original mask is the prevalent method for replicating CGHs originally rendered by the abovementioned reprographic method.

The synthesis of static computer generated holograms can be seen as a two-step process. First an interferometric recording of the diffracted wave field generates the hologram. Then, this unique pattern is transferred to a semi-rigid material and subsequent illumination of this "diffraction grating" is reconstructed by diffraction to generate the CGH.

Many other forms of coherent energy, which are characterized by wave fronts, are also amenable to the methodologies of the present invention thereby enabling any part of the electromagnetic spectrum to be utilized in conjunction with the present invention. Thus in addition to the above use of CGHs, the use of acoustic files as previously confined to the field of acoustic holography, is adapted to the methods of this invention. In these embodiments, the spatial domain of acoustic information is converted into a binary form while the acoustic holographic image is generated.

Generally, holographic planes receiving the reference acoustic energy and the acoustic energy reflected or refracted from the object is scanned by an electronic detector, and used as an indication of the energy available at the receptive points. One way to achieve this is through the system generating a phase related accompanying signal that is able to convert the electrical signals into a binary form whereby the intensity of the created hologram is contained in the amplitude and width of the transparent binary bits employing Fourier transformations.

The addition of random phase noise is required to generate once again a binary output that can also be translated to a rigid substrate. An example of the reconstruction of the final image is performed using digital reconstruction processes that represent inverse transformations of the algorithms thereby generating electronic files representing the original message, when viewed in the reconstructed process.

Jerome L. Pfeiffer awarded in Nov. 19, 1974 U.S. Pat. No. 3,849,758 for "Systems for Making Binary Holograms" describes a system for converting acoustic holograms into binary data. The art of digital data storage in the form of Fourier transform holograms and the use of optical means to decode such transforms can be traced to Alva Knox Gillis et al. in U.S. Patent entitled "Recording and Reading Synthetic Holograms" awarded on Sep. 5, 1978. Subsequently, another disclosed embodiment using electromagnetic waves in the Infra Red (IR) region as one of the information carrying wave fronts is apparent in U.S. Pat. No. 4,880,286 "Making a Holographic Optical Element Using a Computer Generated Hologram" awarded to Charles C. Ih on Nov. 14, 1989. U.S. Pat. No. 4,960,311 "Holographic Exposure System for Computer Generated Holograms" awarded to Gaylord E. Moss and John E. Wreede on Oct. 2, 1990 discloses a system for exposing a recording medium with a computer generated diffraction grating to reduce multiple order scattering noise. U.S. Pat. No. 5,111,445 entitled "Holographic Information Storage System" granted to Demetri Psaltis on May 5, 1992 discusses the use of Fresnel and Fraunhofer holograms to provide a parallel hologram readout method on optical discs. U.S. Pat. No. 5,426,520 entitled "Method of Legitimate Product Identification and Seals and Identification Apparatus" awarded to Kakae et al. on Jun. 20, 1995 provides a method of using a die to emboss a Fourier transform hologram and a device that can identify this seal. U.S. Pat. No. 5,546,198 awarded to Joseph van der Gracht and Ravindra Athale on Aug. 13, 1996 provides an eyeglass/viewing device containing a suitably encoded holographic image. William C Sweatt, U.S. Pat. No. 5,7329,365 entitled "Computer Generated Holographic Microtags" awarded in Mar. 17, 1998, proposes the use of multiple computer generated holograms in submicron size dimensions requiring appropriate decoding readers. U.S. Pat. No. 6,263,104 B1 entitled "Method and Apparatus for Reading and Verifying Holograms" awarded to Stephen McGrew on Jul. 17, 2001, describes the use of scanning a hologram with a laser beam and analyzing the diffraction pattern, thereby making this a generalized extension of several (earlier) reading devices that required specially adapted holograms.

SUMMARY OF THE INVENTION

The present invention is directed to procedures for the preparation of computer generated holographic digital images or optical disc logic that can be reproduced using phase contrast modulation and optical/photochemical or e-beam imaging technologies to create a template that is used to emboss thin substrates such as polypropylene sheets/rolls as low as 12 microns in thickness. More specifically the present invention is directed to methods for mass manufacturing binary information on thin plastic substrates using a master shim.

We describe a process that starts with a digitized image, which is Fourier transformed and normalized to generate binary phase values that are translated into a phase-contrast modulated topography. This enables us to generate a 3-dimensional representation of the binary file in the form of hollow structures (akin to "pits" in a CD). The final effect is that a colorful replica of the original image, after being transformed into a Computer Generated Hologram and micro-embossed onto a suitably receptive transparent surface, is visible around every point source of light (white or colored) viewed through such a processed substrate.

One embodiment of the methods of the present invention consists of selecting the input data/image file embedded into a 2 dimensional matrix (A) that is represented by (x,y) elements. Here each number represents the desired brightness (and coordinates or distance from centre) of the corresponding point in the pattern. Some embodiments of the present invention use a binary system. In other implementations, higher grayscale values to generate images of higher tonality may be employed. Multiplying element to element then normalizes the original matrix, with randomly distributed phase values and unity values for amplitude to generate a new matrix (B). A Fast Fourier Transformation of (B) leads to (C) which results in the matrix having complex numbers containing both amplitude and phase variations. Phase values, when needed, are use to cancel out the conjugate image as demonstrated by Horikoshi et al. in Proceedings of SPIE, Practical Holography 1998; 3293, 30–37) and generate a hologram file containing only binary amplitude elements. This binary amplitude matrix can be printed onto a transparency using a high-resolution imagesetter (for e.g. Scitex 4Press) with each element's amplitude value being represented as a pixel of 7–14 micron diameter. The results of a sequential process of reducing pixel sizes may be provided by observing these patterns through a microscope.

After creating a binary digital file that encodes a unique diffraction pattern that has been generated as a CGH, further steps involve the replication of this pattern using the tools available in the optical disc manufacturing industry. Specifically, the CD surface is a "reflection grating" that acts similar to a diffraction grating. The pits on a CD cause diffraction to take place. Light diffracted by the grating consists of a zero order and multiple first order beams that overlap to create destructive and constructive interference patterns. A difference in terms of the depth of the pit equivalent to one-quarter-wavelength of light results in light striking the pit to be out of phase with the light striking the land. This results in destructive and constructive interference (upon reflection) between the zero order and first order beams as well as along all other rays. We have extended this concept to generate the required phase masks from amplitude values obtained in the CGHs. However our calculations for obtaining pit depths are doubled due to the transmissive nature of light that we observe, as opposed to the reflected waves in the case of CDs.

Using currently available mastering systems, we have mastered discs by using a glass plate in the master cutter, and subsequent alkali treatment for development. Following development, a metal coating, usually of silver is evaporated onto the photo resist layer and then the master disc is prepared for electroforming and replication. Subsequently we construct a nickel template that corresponds in 3 dimensions (topographically) to an image of the original binary CGH. Our process of creating this CGHT (Computer Generated Hologram Template) utilizes a novel encoding method on the master to direct it to make pits of appropriate depth depending on parameters such as substrate, temperature, and pressure to provide an appropriate reproduction of the original pattern.

Furthermore, the application of the utility of such templates is exceedingly wide ranging, from embossing plastics, glass and other composite materials during their manufacture in the molding stage, to the creation of optical discs that can be embossed with unique identification patterns. A method to protect data and product security as well as access to privileged data identification and access is another application of the present inventions. The utility of these CGHTs in any and every stage of manufacture of plastics or other semi-rigid or rigid structures is encompassed by this disclosure. We show the validity of this approach by creating a template capable of transferring the binary image of a calculated diffraction grating derived as a Fraunhofer diffraction grating into a topologically equivalent distribution of the binary pattern by the process of Phase Contrast Modulation. Plastic material or glass, molded using this type of template appears visibly blank until used to view point sources of light, whereupon a "visually holographic" image of a mathematically defined input object/text becomes apparent around each source of light thus viewed.

The present invention is directed to procedures for the preparation of computer generated holographic electronic images that can be reproduced using phase contrast modulation and holographic imaging technologies to create a template. More specifically the present invention is directed to methods for mass manufacturing two-dimensional binary holograms on thin plastic labels using mastering shim.

More particularly with regard to the computer generated hologram aspects of the present invention, the inventors have proposed use the CGH file for creation of a binary hologram stamper, template, or shim which in turn is used to emboss transparent plastic thin films and sheets such as package labels made, for example, from OPD. In accordance with the manufacturing aspects of this invention, the shim may be readily employed to mass produce tens of thousands of embossed imprints from each daughter shim. These embossed patterns of indicia are invisible to the naked eye but result in a projected viewable image when aligned with a point source of light. Thus in this manner, this aspect of the present invention is directed to producing consumer images associated with marketing products by use of a seemingly transparent label invisibly imprinted with a desired message that appears visible to the consumer only when illuminated with a point source. Additionally it is proposed that the use of Infra Red (IR) transmission instruments be used as illuminating sources and that be used in conjunction with a receptive surface such as an array of IR detectors thereby regenerating an IR image reconstructed through a CGH carrying substrate, and invisible to the naked eye. Such an arrangement is in principle possible with any electromagnetic source and an appropriate detector system.

As would be understood by those skilled in the art, a CGH is typically formed by first creating a "mother cell" that includes the minimal encoded optical information to reconstruct the image when light is diffracted by the cell. To enhance the viewing experience, the mother cell is typically repeated in a checker-board pattern over a large area of the medium or film of choice. In accordance with another aspect of the present invention, the inventors propose the use of "super cells" and "super mother cells" to produce different desired images as a function of viewing angle. In accordance with the teachings of the present disclosure, a super cell is a group of mother cells containing identical patterns of optical information, i.e. the same recorded image. At a minimum, the super cell includes one mother cell. According to additional teachings of the present disclosure, a super mother cell includes at least two super cells.

The present invention is further directed, more specifically, to a method for mass-producing customized and distinctive CGHs of data/images using a PCMT in the form of a specialized mastering shim. This creates a virtually blank, transparent and featureless object, defying attempts at photography, copying/scanning/reconstruction for unauthorized production of imitation products/documents. Such a mastering shim can be produced using current holographic optical/photochemical techniques as well as electronically-aided laser or e-beam techniques.

Another method for mass-producing specialized CGHs of data/images is through "pattern de-metallizing" of transparent filmic substrates using the gravure process. While another method for mass-producing specialized CGHs uses laser-marking on transparent substrates such as acrylic and glass for example.

Still yet a further method according to the present invention utilizes the entire available space, within a four-quadrant system, to display/project the CGH-encrypted image. This method results in producing binary interference patterns that create projected images that are more legible, more accurate, and brighter on account of their increased size, since they occupy two adjacent quadrants instead of one, and being closer to the origin or light source.

A method for creating a CGH-image of a diffraction-dithered grayscale (8-bit) using binary PCMT is also provided.

The present invention is also directed to a method for displaying/projecting a grayscale image using a specialized light-source arrangement wherein a high-density CGH is illuminated simultaneously through an array of coordinated light-sources (instead of a high-power laser and related magnifying and projecting lenses). The advantage hereof is portability and convenience in use (e.g. on the desks of passport/visa examining officers at airports).

A method for manipulating and compressing a CGH file along a particular axis or direction such that it can be displayed/projected appropriately only by illuminating it at an angle either by a suitable inspection instrument or by a suitable viewing procedure to thereby further defy attempts at counterfeiting.

The present invention further includes combining some of the above methods to create compact 8-bit CGHs thus requiring common, portable light-sources for illumination as opposed to a high-power laser source and downstream arrangement of optical elements for magnification and projection, thus enhancing its utility as a security device.

It is, therefore, an object of the present invention to improve methods of commercial manufacturing holograms and CGHs. An aspect of the present invention is directed to master making and shim embossing to thereby enable mass-manufacturing methods as an improvement over currently-available reprographic printing and photographic reproduction methods.

Another object of the present invention to is to provide methods for mass manufacturing binary diffractive optic elements on thin plastic labels using mastering shim to produce a desired computed image or several different images.

Still a further object of the present invention to is to provide methods for mass manufacturing Optical Disc information (audio, electronic, or acoustic) on thin plastic labels using mastering shim to produce the desired input information.

Yet another object of the present invention is to encrypt pixels by a method of rectangulation.

Still another aspect of the present invention is directed to providing an apparatus and method for decoding pixels encrypted by the present rectangulation methods by visible light.

Yet still a further aspect of the present invention is directed to provide electromagnetic sources as illuminators in non-visible regions of the spectrum and to detect these with appropriate sensitivity matched detectors.

These and other objects are attained in accordance with the present invention wherein there is provided a method of recording an image. The method includes the steps of providing an original image; fragmenting the original image into at least two parts including a first part and a second part; forming a mirror image of one of the a least two parts; inverting the first and second parts; forming a binary pattern of the first part and the second part, the binary pattern in each of the parts including information representing a respective portion of the original image; and forming a mirror image of the binary pattern of the one of the a least two parts.

The present invention is further directed to an image storage medium including a substrate for supporting recorded image information in a binary form; a first binary pattern containing information of a respective first portion of an original image; and a second binary pattern containing information of a respective second portion of the original image. The second binary pattern formed by forming a mirror image of its respective portion of the original image, inverting the mirror image to form an inverted mirror image thereof, forming an intermediate binary pattern of the inverted mirror image, and forming the second binary pattern by creating a mirror image of the intermediate binary pattern.

According to another aspect of this invention, there is provided a method of creating a holographic image. This method includes the steps of (1) providing an original image, (2) fragmenting the original image into two parts including a first part and a second part, (3) forming a mirror image of the second part, (4) inverting the first and second parts, (5) forming a binary pattern of the first part and the second part, the binary pattern in each of the parts including information representing a respective portion of the original image, (6) forming a mirror image of the binary pattern of the second part, (7) illuminating the binary pattern of the first part to thereby form a first projected image, (8) illuminating the mirror image of the binary pattern of the second part to thereby form a second projected image, and (9) superimposing the first projected image with the second projected image to thereby form a reconstructed image of the original image.

According to another aspect of this invention, there is further provided a method of forming a super mother cell. This method includes the steps of providing a group of image elements, each of the image elements including a respective original image; forming a binary pattern of each image element, each of the binary patterns of the image elements including information representing the respective original image associated therewith; and arranging the binary patterns in a desired formation.

A related method of creating a holographic image from a super mother cell includes providing a group of image elements, each of the image elements including a respective original image; forming a binary pattern of each image element, each of the binary patterns of the image elements including information representing the respective original image associated therewith; arranging the binary patterns in a desired formation; and illuminating the desired formation of binary patterns to thereby form a projected image of the group of image elements.

The present invention further includes a super mother cell of binary patterns. This cell includes a substrate for supporting recorded image information in a binary form; a first binary pattern containing information of a first original image; and a second binary pattern containing information of a second original image. The first and second binary patterns arranged on the substrate in a desired manner to thereby create a recording of an integrated image including the first and second original images.

In accordance with yet another aspect of this invention, there is provided a method of creating a holographic image from a super mother cell of binary patterns. This method include the steps of providing a substrate for supporting recorded image information in a binary form; providing a first binary pattern containing information of a first original image; providing a second binary pattern containing information of a second original image, the first and second binary patterns arranged on the substrate in a desired manner to thereby create a recording of an integrated image including the first and second original images; and illuminating the substrate to thereby form a projected image of the integrated image.

According to still yet another aspect of this invention, there is provided a method of encrypting a pixel pattern. This method comprises the steps of providing a pixel pattern including a plurality of individual pixels, each of the pixels being square in formation and occupying a defined area; and reducing each square pixel by a desired amount to thereby form in each of the defined areas a contracted pixel and corresponding open field that allows incident light to pass therethrough.

There is also provided an apparatus for reconstructing and viewing an image stored in an encrypted pixel pattern. The apparatus comprises a member for holding and rotating a medium including a recording of an encrypted pixel pattern; a source of incident electro-magnetic radiation, the source adapted to direct an incident beam at the medium to thereby create a transmitted beam carrying information associated with the pixel pattern; and a detector for detecting the transmitted beam.

BRIEF DESCRIPTION OF THE DRAWING

Further objects of the present invention together with additional features contributing thereto and advantages accruing there from will be apparent from the following description of the preferred embodiments of the invention which are shown in the accompanying drawing with like reference numerals indicating like components throughout wherein.

DETAILED DESCRIPTION OF THE INVENTION

Figure 1:
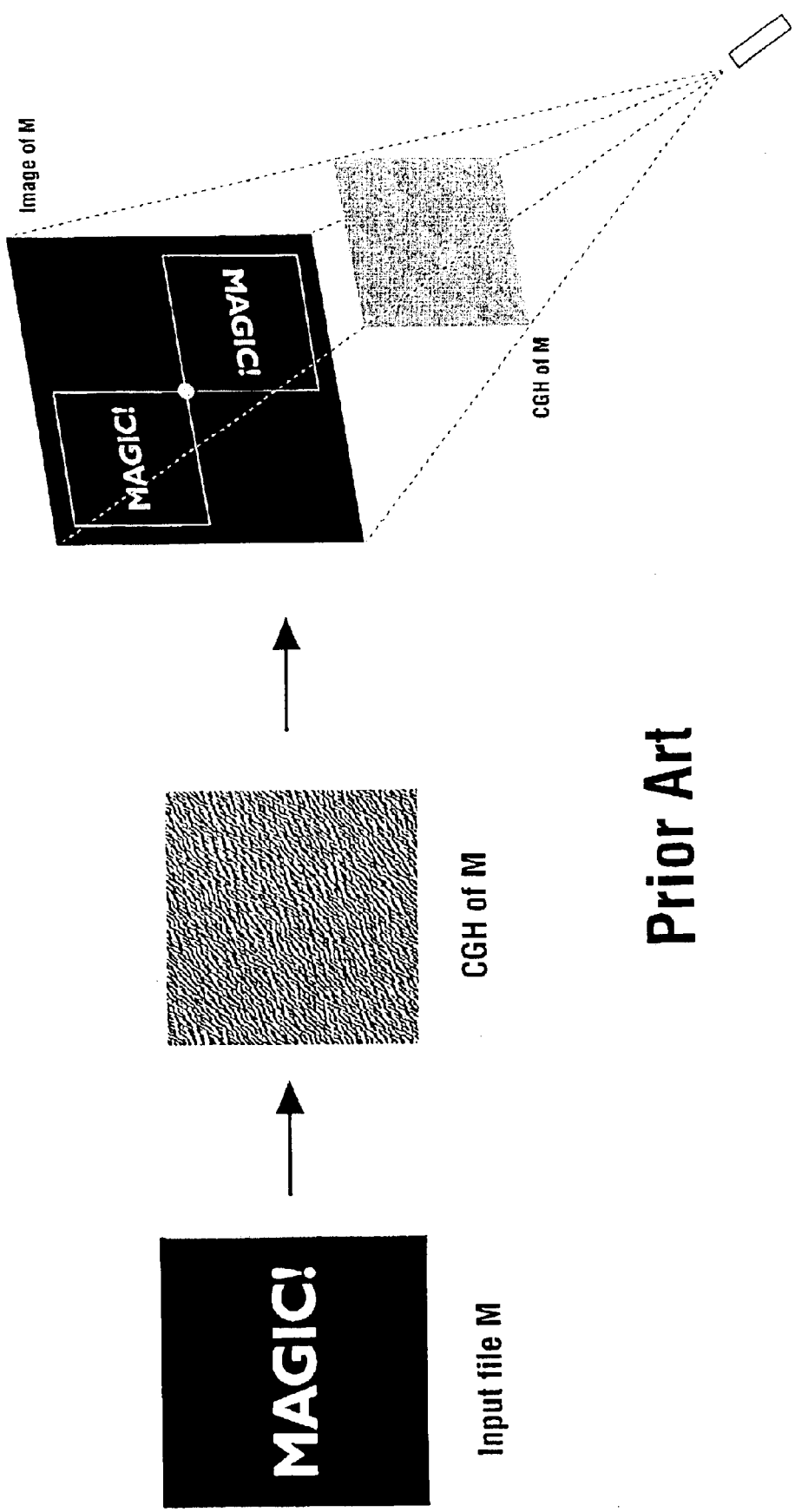
FIG. 1 is a pictorial view of a prior art method of generating a computer generated hologram.

Currently, CGHs are created in such a manner that when they are viewed with the help of a light source of limited extent, the text or image encoded in the CGH is observed to be occupying only two of the four quadrants as defined by the point source, seen as the origin, and its first order replicas. FIG. 1 shows an input image file here, for example, the word "Magic!" as illustrated. FIG. 1 also depicts a graphical representation of a typical CGH. As shown in FIG. 1, when the CGH is illuminated by a point source, the image "Magic!" occupies the top left quadrant and its conjugate image occupies the bottom right one.

With a view to improving the visual quality of CGH images, the present invention is directed to a method whereby CGHs are created in such a manner that the final image created occupies all four quadrants. FIGS. 2A–2G are pictorial representations showing the steps of forming a computer generated hologram using the bifurcation embodiment of the fragmentation method of manipulating an original image according to the present invention.

Figure 2A:
FIGS. 2A–2G are pictorial representations showing the steps of forming a computer generated hologram using the bifurcation embodiment of the fragmentation method of manipulating an original image according to the present invention.
Figure 2B:
Figure 2C:
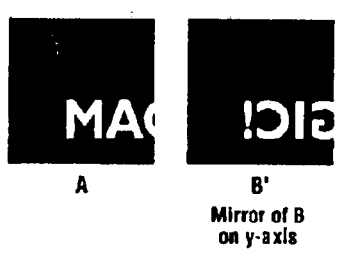
Figure 2D:
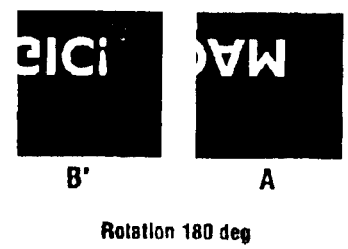
Figure 2E:
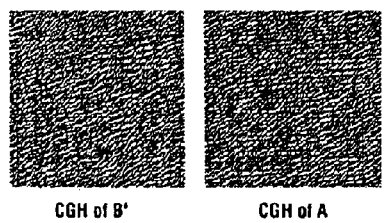
Figure 2F:
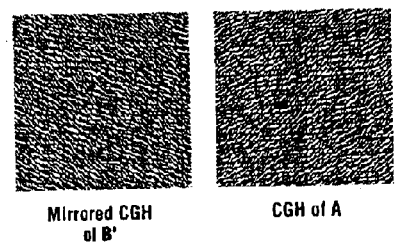
Figure 2G:
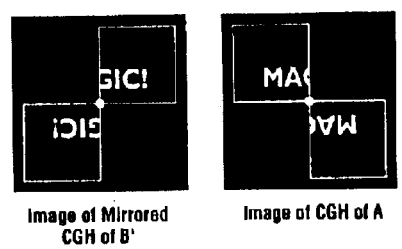

FIG. 2A shows the input image. In FIG. 2B the input image is fragmented, in this embodiment split in two or "bifurcated". As would be apparent to one of skill in the art given the present disclosure, the input image may be fragmented into any desired number of fragment elements greater than two. Thus two fragment elements are used here for illustration purposes only to represent one embodiment hereof. As indicated, the two fragment elements are identified as Part A and Part B. In FIG. 2C, the mirror image of Part B is taken along the y-axis to form Part B'. Next in FIG. 2D, Parts A and B' are rotated by 180 degrees and are interchanged left-for-right, and right-for-left as indicated. FIG. 2E depicts a graphical representation of the CGH of Part B' and the CGH of Part A. In the next step of this process, a mirrored CGH of Part B' is prepared and placed next to the CGH of Part A. As shown next in FIG. 2G, the image reproduction of the mirrored CGH of Part B' produces the repeated upper-right and lower-left quadrant images of the indicated fragment. FIG. 2G also shows the image reconstruction of the Part A CGH to yield the upper-left and lower-right images as illustrated.

Figure 3:
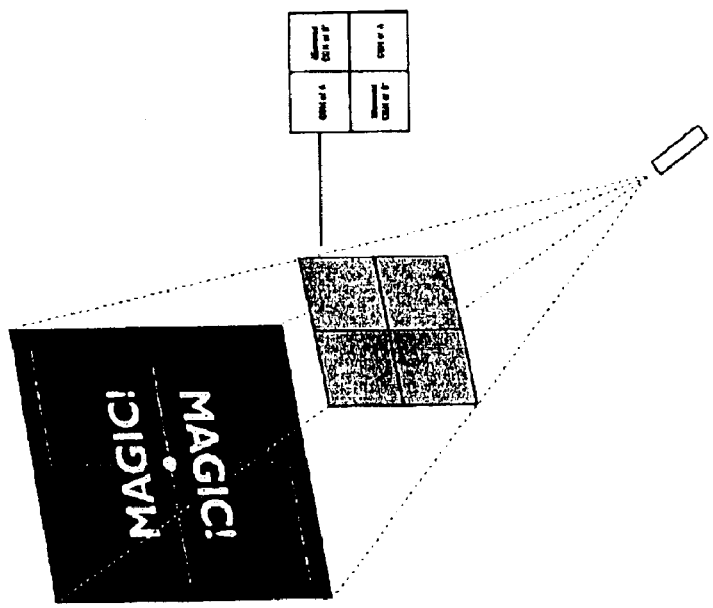
FIG. 3 is a perspective view of the reconstruction of the original images that were transformed according to the method applied in FIGS. 2A–2G.
Figure 3:
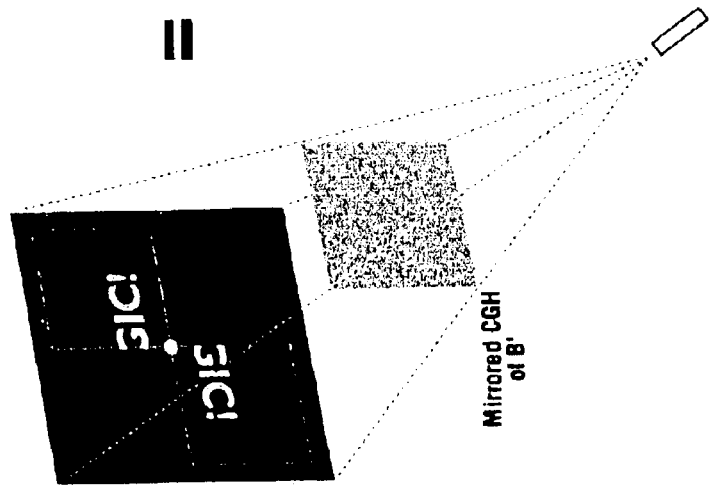
Figure 3:
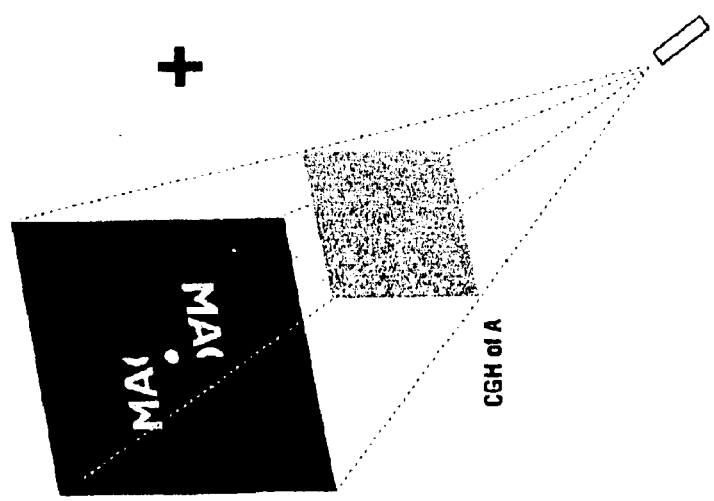

FIG. 3 illustrates the advantages of the above fragmentation method relative to image reconstruction and image quality for viewing purposes. FIG. 3 is a perspective view of the reconstruction of the original images that were transformed according to the bifurcation embodiment of the fragmentation image encoding method applied in FIGS. 2A–2G. As illustrated in FIG. 3, when the reconstructed image of the CGH of Part A is superimposed on the reconstructed image of the CGH of Part B', the reconstructed image of the word "Magic!" now spans across both the top left and the top right quadrants, and its conjugate image spans across the two quadrants at the bottom. Thus FIG. 3 shows that complimentary CGHs of Part A and Part B' can be juxtaposed to create an improved image of M.

The process and steps shown is FIGS. 2A–2G and 3 may be thus summarized. Start with the input file, M (containing the word "Magic!") and split it into two (A and B) along the vertical axis. Position the word "Magic!" closer or farther away from the origin to optimize the brightness and legibility of the image (when finally viewed). Mirror the second file, B along the Y axis to obtain B'. Rotate the two files, A and B' by 180 degrees so that the image (when finally viewed) has the word "Magic!" in the upper two quadrants, and can be read right side up, from left to right while its conjugate lies in the lower two quadrants.

Subject the two files thus created, individually, to the Fourier transformation and related iterative processes such that obtain two disparate output files CGH A and CGH B'. Again mirror the output file, CGH B' along the vertical axis. Now place the two files thus obtained side by side and replicate this pair on both axes for ease of viewing. This pair of CGH files, replicated on both axes, is then rendered on a suitably transparent substrate and appropriately illuminated for viewing the image. The final image thus created is larger (since it utilizes all four quadrants), brighter, and of higher resolution thus making it more easily discernible and legible.

In applications utilizing this method, the above method not only improves the visual quality of the image but also allows one to treat the two component CGHs (of A and B') as complements of each other in a two-piece distribution. In one specific use hereof, one component CGH may be integrated on or in the package or packaging, for example, of a product thus sought to be authenticated and protected from forgery, and the other component CGH so integrated in a corresponding manner on or in a suitable verification instrument in the hands of authorized inspectors.

Figure 4A:
FIGS. 4A, 4B, and 4C are pictorial and perspective representations showing the concatenation method according to the present invention to form a super cell by juxtaposing a series of individual mother cells each containing separate information.
Figure 4A:
Figure 4A:
Figure 4A:
Figure 4A:
Figure 4A:
Figure 4B:
Figure 4C:
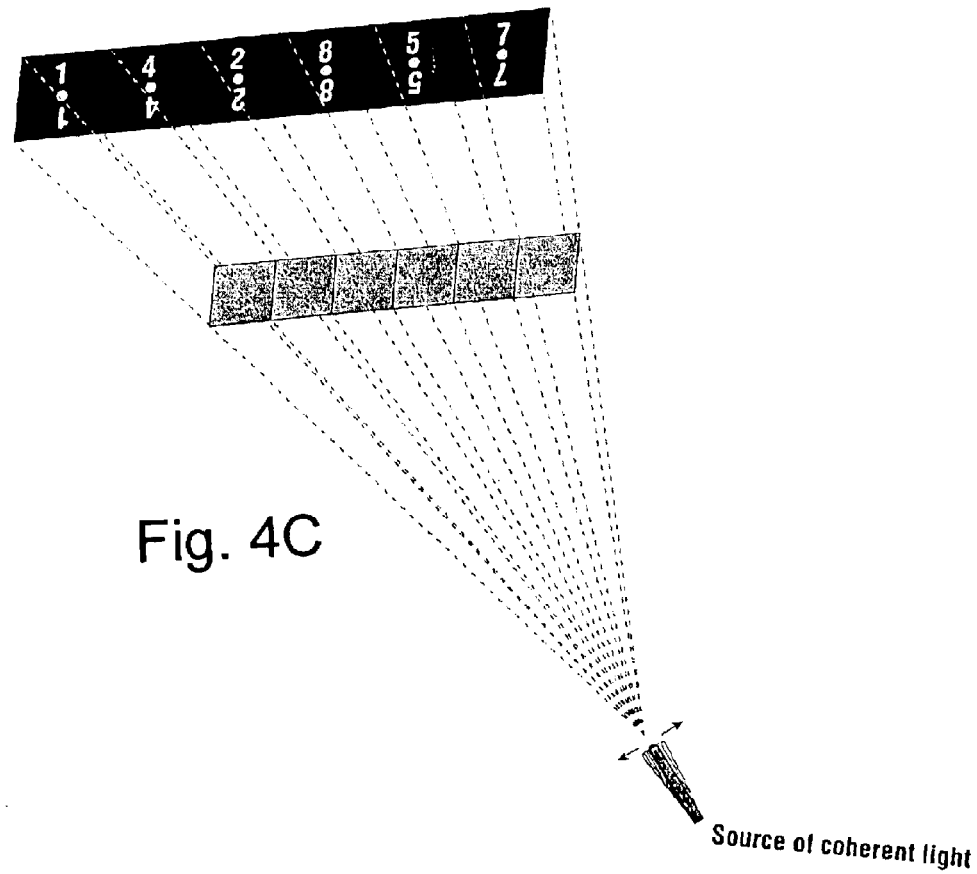

FIGS. 4A, 4B, and 4C are pictorial and perspective representations showing the concatenation method according to the present invention to form a super cell by juxtaposing a series of individual mother cells each containing separate information. More specifically, FIG. 4A shows a series of images. These images may be related or unrelated depending of the desired implementation. Here in FIG. 4A, the series of images includes a list of numbers which may represent a serial number, identification number, or bar code number. The individual digits are arranged to form the number sequence "142857" for purposes of illustration. Also shown in FIG. 4A is the corresponding CGH of each of the number elements. FIG. 4B illustrates the concatenation of the individual mother cells to form the super cell according to the present invention. Here the super cell is a 1 by 6 strip or series cell. Any other suitable configurations may be readily employed as desired. In one specific embodiment, the size of each individual mother cell is 1.28 square mm. In the 1 by 6 super cell shown, the width thereof when employing mother cells of 1.28 mm square is thus 7.68 mm. This unit super cell of 6 matrices may then be replicated several times on both the x-axis and y-axis for ease of illumination and improved image quality. FIG. 4C illustrated the reconstruction of the original number series of FIG. 4A using the concatenated super cell of CGHs shown in FIG. 4B.

Figure 5:
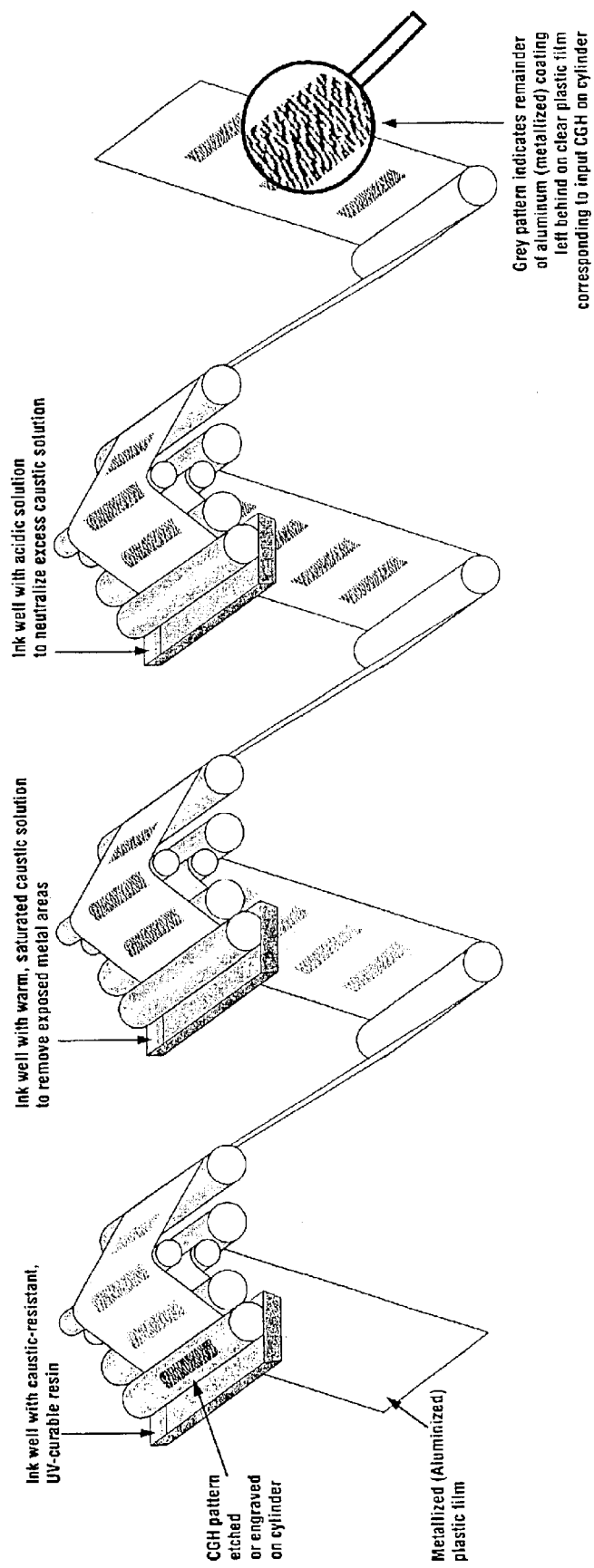
FIG. 5 is perspective pictorial view of a manufacturing process of forming a CGH pattern on a metallized plastic film using the micro-demetallizing and stabilizing steps of the present invention.

With reference now to FIG. 5, there is shown a process for making CGHs. These methods include the process steps of micro-demetallizing a pre-metallized transparent film in the form of a web. They may be implemente-22-d and utilized to incorporate a CGH-based product-authentication feature in the production of flexible packaging material through a simple integration of the two processes.

As understood by those skilled in the art, a 'web' is a term given to a roll of plastic film which is woven over a series of rollers or cylinders for the processes of printing, coating, laminating, curing, embossing, drying, or similar processing. The gravure and flexo-graphic processes are the two most commonly used processes for printing and treating flexible plastic substrates in roll form. The other commonly used processes of printing, i.e. offset lithography and screen-printing, are usually employed to print on 'sheets' of less flexible substrates such as paper, rather than 'rolls'.

Thus far, the utilization of micro-demetalllization of plastic film substrates, using caustic-resistant resin, etchants, and neutralizers as described in the above mentioned web-based process patents, has been restricted to (1) microwaveable packaging wherein microscopic demetallized pores/windows allow microwaves to heat/cook comestibles packaged in metallized plastic films; and (2) micro-circuitry in the semiconductor industry wherein the conductive ability of selectively metallized areas are used to transmit electricity along a component's internal circuit.

The present inventors herein propose that the new process described in further detail below in conjunction with FIG. 5, can be used to create a CGH master on a suitably-treated metal cylinder (as used in the gravure process) using photo-chemical etching (not diamond-stylus engraving) such that a high-resolution CGH pattern is reproduced onto the metal surface in the form of concave cells (of approx. 10 micron diameter).

Since CGHs cannot be readily 'printed' given the inherent limitations of all printing processes, especially due to the incompatibility between the relatively large particle-size of printing ink and the high-resolution required for a CGH to be a useful diffraction grating (with approximately 10 micron×10 micron individual pixels), we propose an alternative method that does not 'print', but instead selectively removes metal particles that have already been deposited all over a flexible plastic substrate, by any of the commonly practiced metallization processes.

In order to selectively remove metal particles from corresponding transparent areas of the CGH pattern, at the resolution of 10 microns by 10 microns, we first transfer an etchant-resistant resin (not an ink) onto the metallized surface of the plastic substrate using a cylinder which has been photo-chemically etched with the bespoke CGH pattern.

We then allow the remainder of the metallized surface thus exposed (i.e. not protected by the resin) to be etched away by a warm caustic solution at the second station of the web.

In order to control the etching process and to restrict it only to the removal of metal particles from around the resin-covered areas, we neutralize the caustic acting on the metallized layer with an acidic solution, at the third station of the web. Thus the metallized portions remaining on the otherwise transparent film substrate represent the opaque or black pixels of a CGH matrix. Consequently, when light passes through such a pattern, a hologram is easily discernible.

The advantages of this process include (1) it is easily integrated with currently employed processes of printing and metallization of flexible plastic substrates; (2) it is an inexpensive process for incorporating CGH-based security features onto inexpensive packaging substrates; and (3) it is resistant to fraud (cannot be scanned, photocopied or photographed), due to its reflectivity, its microscopic size and due to its amenability to be hidden within the graphics of the package without affecting its utility.

With specific reference now to FIG. 5, the first set of rollers shown therein utilize a ink well with caustic-resistant, UV-curable resin as illustrated. This first station also shows a metal embossing roller or cylinder having the desired CGH pattern etched or engraved thereon. The input web is a metallized plastic film or web, preferably metallized with aluminum. The plastic file is preferably formed from polyester. At the second roller station, the ink well is loaded with warm, saturated caustic solution to remove exposed metal areas. At the third roller station, the ink well is loaded with an acidic solution to neutralize any excess caustic solution remaining on the film after the treatment at the second roller station. As depicted at the output roller, the grey pattern indicates a remainder of aluminum (metallized) coating left behind on clear plastic film corresponding to input CGH on the embossing cylinder. Thus in this manner, a CGH including those described herein may be readily manufactured on web material.

Figure 6A:
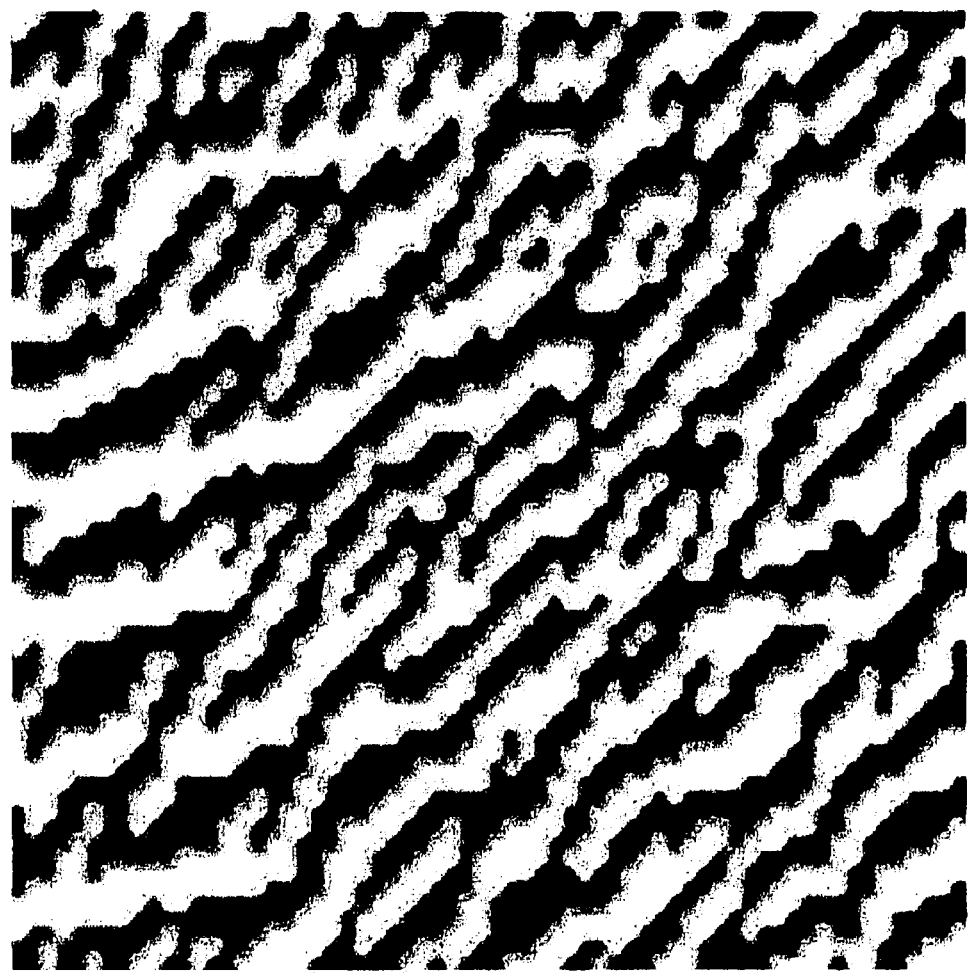
FIG. 6A is a is an enlarged depiction of a typical CGH mother cell showing individual pixels of 10 micro squares.
Figure 6B:
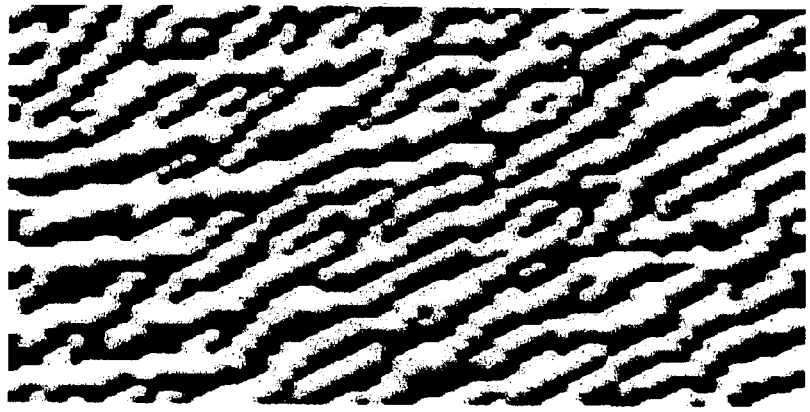
FIG. 6B is an enlarged depiction of the CGH mother cell shown in FIG. 6A in which each pixel has been retangulated by 50 percent utilizing the pixel contraction method of encryption according to another aspect of the present invention.
Figure 6C:
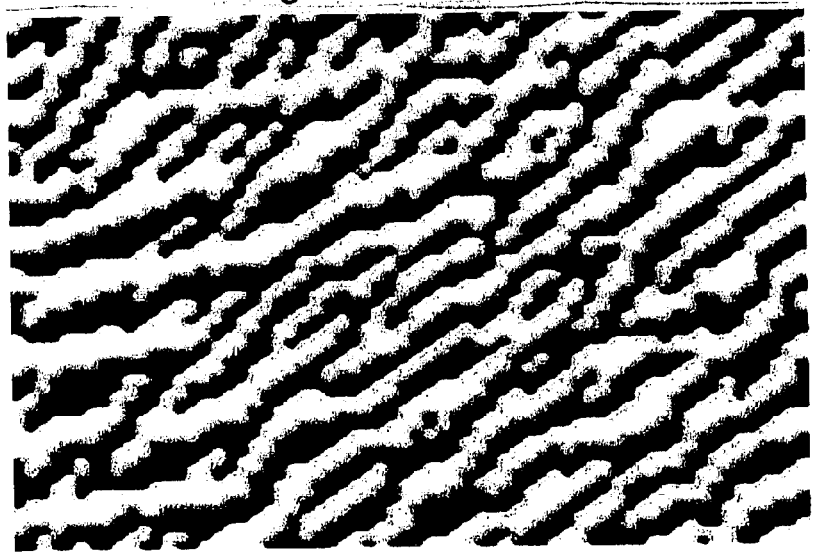
FIG. 6C is an enlarged depiction of the CGH mother cell shown in FIG. 6A in which each pixel has been retangulated by one-third by using the pixel contraction method of encryption according to this invention.

According to another aspect of the present invention, there is provided a method of pixel encryption. These pixels may be the pixels used to form the CGHs described herein. Alternatively, this method of pixel encryption may be employed to encrypte any data that is stored in an optical or visual binary form. FIG. 6A is a is an enlarged depiction of a typical CGH mother cell showing individual pixels of 10 micro squares. The 10 by 10 micron format is typical. FIG. 6B is an enlarged depiction of the CGH mother cell shown in FIG. 6A in which each pixel has been retangulated by 50 percent according to the pixel contraction method of encryption of the present invention. In this method each pixel is reduced or contracted in size by 50 percent. Thus, for example, every 10 by 10 micron becomes a 10 by 5 micron pixel relative to one axis or, alternatively, a 5 by 10 micron-sized pixel relative to the other orthogonal axis. In this 50 percent more light is transmitted by the CGH. In a similar manner, FIG. 6C is an enlarged depiction of the CGH mother cell shown in FIG. 6A in which each pixel has been retangulated by one-third according to the present pixel contraction method of encryption. In this embodiment, the CGH of FIG. 6C allows one-third more light to be transmitted there through compared to the CGH of FIG. 6A.

When the CGHs of FIGS. 6B and 6C are illuminated with incident light falling perpendicular to the plane of the CGH substrate, the projected image is completely obscured because of the contraction of the pixels. Thus the image information stored in the CHG is thereby rendered inaccessible. The inventors hereof, however, have proposed that when the CGH substrate is rotated by the necessary degrees of rotation relative to an incident beam, the remaining contracted portions of the pixels form "shadow areas" that are replicas of the original square pixels, thus causing the necessary interference to reconstruct the original encoded and encrypted image in a manner suitable for viewing and recognition.

Thus in view thereof, the inventors have proposed a decoding apparatus for reconstructing and viewing the CGH mother cells shown in FIGS. 6A, 6B, and 6C wherein the mother cell of FIG. 6A is a typical CGH and the mother cells of FIGS. 6B and 6C are encrypted according to the pixel contraction methods hereof.

Figure 7A:
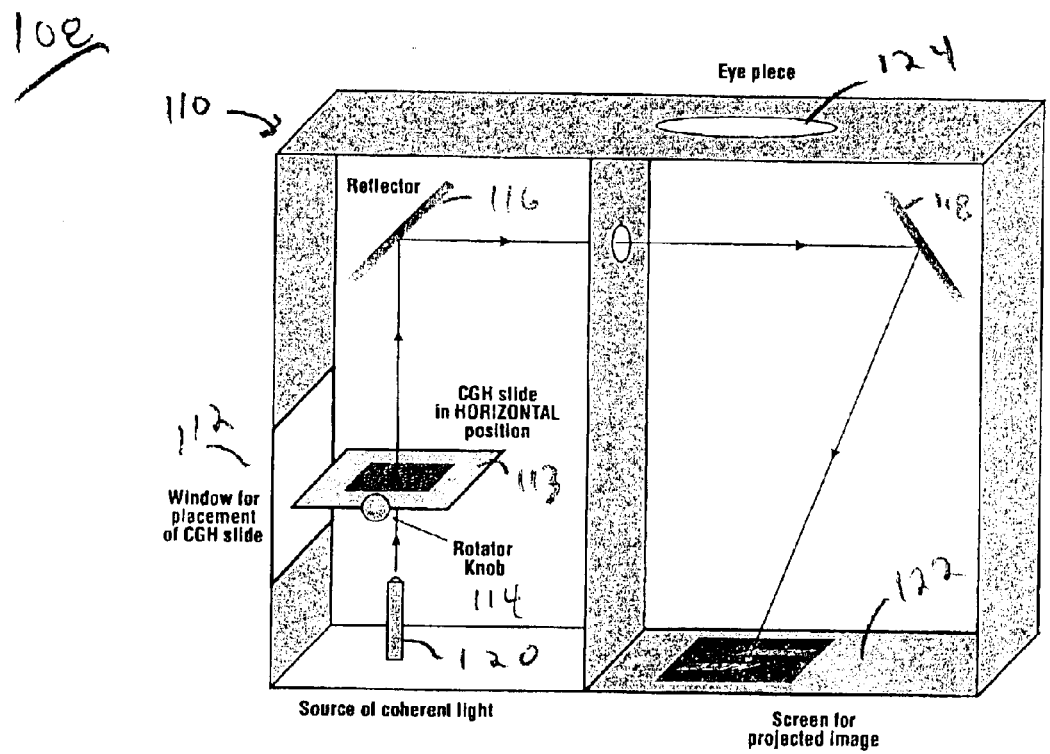
FIGS. 7A and 7B are pictorial perspective views of a decoding apparatus for reconstructing and viewing the CGH mother cells shown in FIGS. 6A, 6B, and 6C.
Figure 7A:
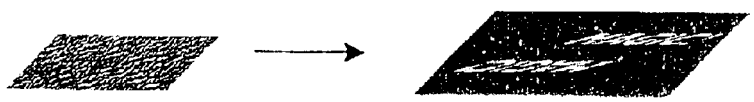

With reference now to FIG. 7A there is shown a decoding apparatus or instrument 108 an instrument housing 110 including a window 112 for placement of the CGH slide 113 as illustrated. The apparatus includes a rotator knob 114 for rotating the CGH slide 113. The decoding apparatus 108 includes reflectors 116 and 118 and a source of coherent light 120 as shown. The apparatus 108 further includes a screen 122 for the projected image and an eye piece 124 for viewing the projected image.

As illustrated in FIG. 7A, when a CHG encrypted according to the pixel contraction method discussed above is situated perpendicular to the incident bean, the projected image on the screen 122 is distorted and unintelligible or illegible. However, when the rotating knob 114 is employed to rotate the CGH slide 113, the projected image on the image screen becomes perfectly legible or clear.

Figure 7B:
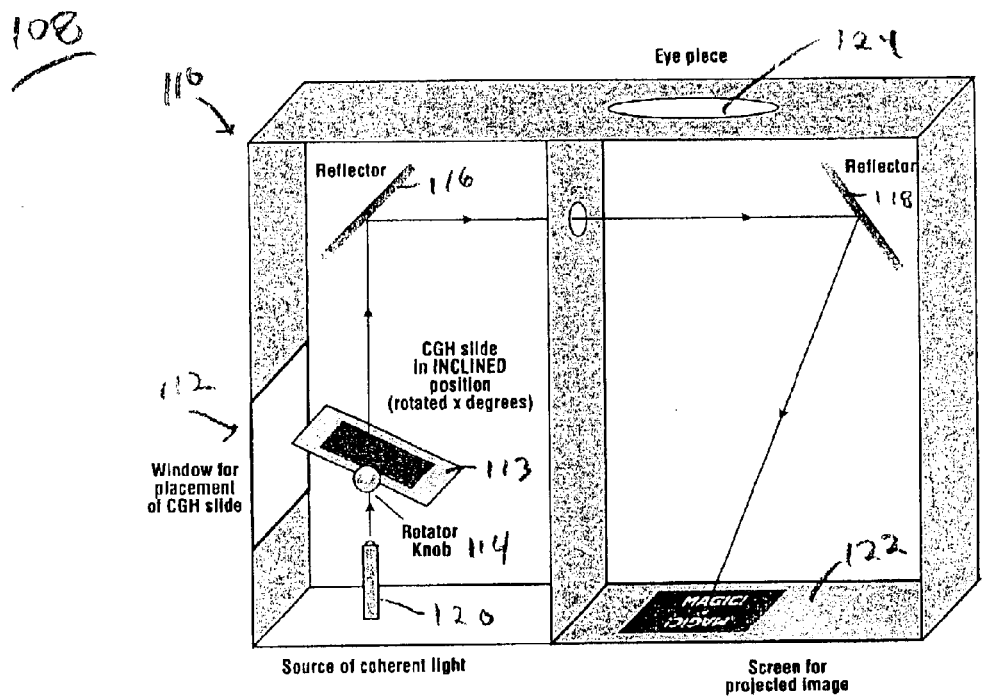
Figure 7B:
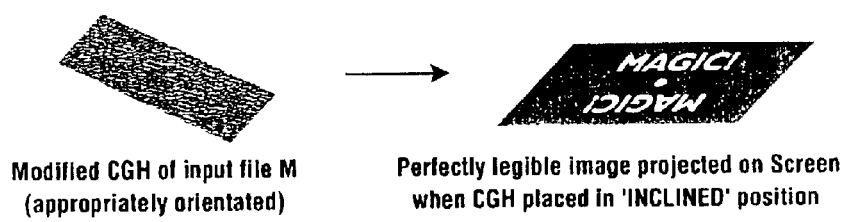

It should be understood that the apparatus illustrated in FIGS. 7A and 7B is presented principally in functional elements for illustration purposes. Commercial embodiments of the apparatus may ultimately appear quite different from the customer's view point but may still include the basic elements shown here in the indicated combination to achieve these intended results.

While this invention has been described in detail with reference to certain preferred embodiments, it should be appreciated that the present invention is not limited to those precise embodiments. Rather, in view of the present disclosure which describes the current best mode of practicing the invention, many modifications and variations would present themselves to those skilled in the art, without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. A method of recording an image, said method comprising the steps of:

providing an original image;

fragmenting the original image into at least two parts including a first part and a second part;

forming a mirror image of one of said a least two parts;

inverting said first and second parts;

forming a binary pattern of said first part and said second part, said binary pattern in each of said parts including information representing a respective portion of said original image; and forming a mirror image of said binary pattern of said one of said a least two parts.

2. An image storage medium, comprising:

a substrate for supporting recorded image information in a binary form;

a first binary pattern containing information of a respective first portion of an original image; and a second binary pattern containing information of a respective second portion of said original image, said second binary pattern being formed by forming a mirror image of its respective portion of said original image, inverting said mirror image to form an inverted mirror image thereof, forming an intermediate binary pattern of said inverted mirror image, and forming said second binary pattern by creating a mirror image of said intermediate binary pattern.

3. The image storage medium according to claim 2 wherein said first binary pattern is formed on said substrate.

4. The image storage medium according to claim 2 wherein said second binary pattern is formed on said substrate.

5. A method of creating a holographic image, said method comprising the steps of:

providing an original image;

fragmenting the original image into two parts including a first part and a second part;

forming a mirror image of said second part;

inverting said first and second parts;

forming a binary pattern of said first part and said second part, said binary pattern in each of said parts including information representing a respective portion of said original image;

forming a mirror image of said binary pattern of said second part;

illuminating said binary pattern of said first part to thereby form a first projected image;

illuminating said mirror image of said binary pattern of said second part to thereby form a second projected image; and superimposing said first projected image with said second projected image to thereby form a reconstructed image of said original image.

6. The method of creating a holographic image according to claim 5 wherein said reconstructed imaged includes a projected image of said original image spanning two upper quadrants of an image plane, and an inverted projected image of said original image spanning two lower quadrants of said image plane.

* * * * *